United States Patent
Schlecht

(10) Patent No.: US 8,079,889 B2
(45) Date of Patent: Dec. 20, 2011

(54) METHOD FOR CONNECTING A DISCHARGE VESSEL OF A DISCHARGE LAMP TO A TUBE SECTION, ESPECIALLY A PUMP TUBE

(75) Inventor: Josef Schlecht, Poettmess (DE)

(73) Assignee: OSRAM AG, Munich (DE)

( * ) Notice: Subject to any disclaimer, the term of this patent is extended or adjusted under 35 U.S.C. 154(b) by 122 days.

(21) Appl. No.: 12/679,914

(22) PCT Filed: Sep. 19, 2008

(86) PCT No.: PCT/EP2008/062556
§ 371 (c)(1),
(2), (4) Date: Mar. 25, 2010

(87) PCT Pub. No.: WO2009/043741
PCT Pub. Date: Apr. 9, 2009

(65) Prior Publication Data
US 2010/0261400 A1 Oct. 14, 2010

(30) Foreign Application Priority Data

Sep. 27, 2007 (DE) .......................... 10 2007 046 343

(51) Int. Cl.
*H01J 61/30* (2006.01)
*H01J 17/16* (2006.01)
*H01J 17/20* (2006.01)
*H01J 9/00* (2006.01)

(52) U.S. Cl. .............. 445/22; 445/26; 445/27; 313/493; 313/634

(58) Field of Classification Search ..................... 313/25, 313/26.3, 318.01–318.12, 493, 573–574, 313/634; 445/22, 26–27
See application file for complete search history.

(56) References Cited

U.S. PATENT DOCUMENTS

| 5,243,256 A * | 9/1993 | Holzer ........................... 313/493 |
| 5,917,276 A * | 6/1999 | Traksel et al. ................ 313/490 |
| 6,734,629 B2 | 5/2004 | Arnold et al. |
| 2004/0207326 A1 * | 10/2004 | Bajnok et al. ................. 313/634 |
| 2006/0197451 A1 * | 9/2006 | Iwase ............................ 313/634 |
| 2007/0176560 A1 | 8/2007 | Hollstein et al. |
| 2009/0134761 A1 * | 5/2009 | Hendriks et al. ............... 313/46 |
| 2009/0284154 A1 | 11/2009 | Beck et al. |

FOREIGN PATENT DOCUMENTS

| DE | 4343007 A1 | 6/1995 |
| DE | 102004018104 A1 | 11/2005 |
| DE | 102005035191 A1 | 2/2007 |
| EP | 1056119 A2 | 11/2000 |
| EP | 1282153 A2 | 2/2003 |
| WO | 2005101453 A2 | 10/2005 |

OTHER PUBLICATIONS

International Search Report of PCT/EP2008/062556 dated Mar. 4, 2009.
Abstract of DE4343007A1.

* cited by examiner

*Primary Examiner* — Anne Hines
*Assistant Examiner* — Tracie Green

(57) ABSTRACT

A method for connection of a discharge vessel of a discharge lamp to a tubular piece is provided, wherein the discharge vessel is heated at the connection point which is provided with the tubular piece, and the material of the discharge vessel which has been softened at the connection point is torn open such that it rests on the inner face of the tubular piece, and a continuous hole is produced in the discharge vessel.

11 Claims, 2 Drawing Sheets

METHOD FOR CONNECTING A DISCHARGE VESSEL OF A DISCHARGE LAMP TO A TUBE SECTION, ESPECIALLY A PUMP TUBE

RELATED APPLICATIONS

The present application is a national stage entry according to 35 U.S.C. §371 of PCT application No.: PCT/EP2008/062556 filed on Sep. 19, 2008, which claims priority from German application No.: 10 2007 046 343.1 filed on Sep. 27, 2007.

TECHNICAL FIELD

The invention relates to a method for connection of a discharge vessel of a discharge lamp to a tubular piece.

BACKGROUND

DE 10 2004 018 104 A1 discloses a discharge lamp which has a discharge vessel which is helical, at least in regions. Tubular pieces can be fitted as pump tubes to this discharge vessel. Pump tubes such as these are used on the one hand to hold a mercury source. By way of example, this may be an amalgam sphere.

Another function of a pump tube is to make it possible to evacuate the discharge vessel and to fill it with an appropriate filling gas via the pump tube during the production of the lamp. A further function which a pump tube can carry out can be considered that of offering the capability for purging the discharge vessel. Furthermore, if it has a sufficiently large cross section, the tubular piece can offer good access capabilities to the discharge vessel, for example in order to introduce the mercury source.

Furthermore, EP 1 282 153 A2 discloses a discharge vessel for a discharge lamp. The inner face of the discharge vessel is coated with a protective layer and with a fluorescent layer. The protective layer is applied directly to the inner face of the discharge vessel and, for example, may be an AlonC layer.

In order to fit the tubular piece, or the pump tube, to the discharge vessel it is necessary for the inner face of the discharge vessel to be wiped free cleanly at the connection point, as a result of which the protective layer is no longer present. This is because, in the connection area between the tubular piece and the discharge vessel, the material of the protective layer actually contributes to the capability to provide sudden changes in the glazing between the pump tube and the discharge vessel.

Since the geometries and configurations of the discharge vessels mean that the process of wiping free can be carried out only at accessible points, the connection between the tubular piece and the discharge vessel can also be made only at a small number of specific points. Furthermore, the process of wiping free at the attachment point is time-consuming, and is associated with a further manufacturing step. This lengthens the manufacturing time and, furthermore, also therefore increases the costs.

SUMMARY

Various embodiments provide a method in which a discharge vessel of a discharge lamp is possible with a tubular piece easily and without effort at many points in the discharge vessel. Various embodiments make this possible against the background that the occurrence of sudden material changes can also be prevented at the widely different connection points.

In the method according to various embodiments, a discharge vessel of a discharge lamp is connected to a separate tubular piece. The discharge vessel is heated at the connection point which is provided with the tubular piece, and the material of the discharge vessel which has been softened at the connection point is torn open such that it rests on the inner face of the tubular piece, and a continuous hole is produced in the discharge vessel. The outer face of the softened material of the discharge vessel is therefore applied to the inner face of the tubular piece at the connection point, and is connected to it. The connection area between the discharge vessel and the tubular piece can be produced at many points on the discharge vessel. Furthermore, it is possible to prevent the occurrence of sudden material changes in the connection area.

Particularly if the inner face of the discharge vessel is provided with a protective layer at the connection point, there is no longer any need to wipe the material of the protective layer off at this point before the discharge vessel is connected to the tubular piece. The method according to the invention now ensures that, even when a protective layer such as this is still present in the area of the connection point on the discharge vessel, this is not introduced into the explicit connection point to the tubular piece, and it is therefore possible to prevent the occurrence of sudden changes, as previously caused by the protective layer, in the connection area.

The tubular piece and the discharge vessel are preferably formed from glass, at least in regions. A configuration composed of glass is provided in particular at the connection points.

Direct contact is therefore made only between the inner face of the tubular piece, which is free of a protective layer, and the outer face of the discharge vessel, which is also free of a protective layer.

Preferably the tubular piece is initially positioned at a distance from the discharge vessel before the connection to the discharge vessel, and that end of the tubular piece which faces the discharge vessel is heated. The separation is in this case chosen such that this prevents an undesirable contact being made between the two components before the tubular piece has been adequately heated at the appropriate point. Furthermore, however, the separation is also sufficiently close that, during this method step, the outer face of the discharge vessel is also preferably heated, at least to a certain extent, at the intended connection point to the tubular piece.

In particular, the distance set between the tubular piece and the discharge vessel during this method step is dependent on the diameter of the tubular piece and/or the power of the heat source which is used to heat the tubular piece and/or the discharge vessel, and/or is dependent on the diameter of the discharge vessel at the attachment point or the connection point, and/or is dependent on the wall thickness of the discharge vessel at the connection point.

Furthermore, this method step makes it possible to heat the tubular piece end in a defined manner without temperature also being applied correspondingly in an undesirable manner to the discharge vessel at the same time.

Before making contact with the discharge vessel, the tubular piece is preferably heated at its end, which faces the outside of the discharge vessel, by means of a heat source which is inserted into the tubular piece.

This procedure in fact makes it possible to heat the front end of the tubular piece very exactly and in a defined manner. Furthermore, this procedure also allows temperature to be applied to the tubular piece end over a very exact and desired length.

Preferably, in order to heat the end of the tubular piece over only a first sub-length of the tubular piece, the heat source is inserted into the tubular piece starting from the end which is remote from the discharge vessel. In order to heat that end of the tubular piece which faces the discharge vessel, a first insertion position of the heat source into the tubular piece is therefore set, which allows defined and precise heating of the end area of the tubular piece.

Preferably, the outer face of the discharge vessel is heated in a defined manner at the connection point after the heating of that end of the tubular piece which faces the discharge vessel. In particular, in this context, further heating is carried out which goes beyond the heating of the outer face of the discharge vessel which may have already taken place during the heating of the end of the tubular piece. In particular, in this context, the outer face of the discharge vessel is heated so as to ensure reliable fitting and connection of the materials between the tubular piece and the discharge vessel at the connection point.

Preferably, after the heating of the end of the tubular piece which faces the discharge vessel, and after the further heating of the outer face of the discharge vessel at the connection point, the tubular piece is brought into contact.

In particular, a gas flow is applied to the softened material of the discharge vessel after the tubular piece has made contact with the discharge vessel at the connection point. This is done in such a manner that the softened material is torn open at the connection point and rests on the inner face of the tubular piece. This in its own right makes it possible in a particularly exact and reliable manner to ensure that the softened material is actually torn open in this direction and at the position which allows the outer face of the material to rest in a defined manner on the inner face of the tubular piece.

The gas flow can preferably be applied to the softened material of the discharge vessel by blowing an appropriate gas flow in over the discharge vessel. However, it is also possible to produce a suction gas flow via the pump tube, which allows the softened material of the discharge vessel to be torn open in the direction of the interior of the tubular piece.

This procedure makes it possible to achieve a very quick procedure for making contact with, and therefore for fitting the tubular piece too, the correspondingly heated outer face of the discharge vessel, and for the softened material subsequently to be blown through directly in order to produce the hole on the one hand, and the contact on the other hand. In particular, this can be done very quickly and with the processes matched to one another, since this can be done at the same point in the manufacturing procedure.

Before the connection to the tubular piece, the inner face of the discharge vessel is preferably coated with a protective layer and with a fluorescent layer.

It has been found to be particularly preferable for the softened material of the discharge vessel to rest like a collar on the inner face of the end of the tubular piece. This actually also makes it possible to produce a particularly effective connection over a surface area which is as large as possible. A bead which curves inwards is preferably produced during the heating of the front end of the tubular piece facing the discharge vessel, over whose inner face the outer face of the material which has been torn open from the discharge vessel then rests. The geometries therefore effectively result in a type of hook system in the connection area. The collar-like structure at the connection point of the discharge vessel after making contact with the inner face of the tubular piece is, in particular, also defined in the form of a funnel. The bead which is formed at the front end on the tubular piece preferably has an inner face with an effectively round cross section, on which the torn-open material of the discharge vessel is then molded. A hooked mutually engaging structure is therefore effectively produced between the tubular piece and the discharge vessel, when illustrated in the form of a cross section.

In particular, the tubular piece is in the form of a pump tube. On the one hand, it can be used as a pump tube via which the discharge vessel can be evacuated and filled with filling gas. However, it is also likewise possible to provide for the pump tube to remain permanently connected to the discharge vessel, and to be used to accommodate a mercury source.

A single heat source is preferably used for all of the heating of the components and the corresponding points. This is then placed at each of the specifically mentioned and advantageous positions as a function of the progress in the production method.

However, it is also possible to provide at least two heat sources, which are then intended to heat different points. In this context, it is possible for these heat sources to carry out the respective heating of the associated points at the same time or successively. It is possible to provide for different points to be heated at the same time, at least at times.

A burner having an open flame, for example a gas burner, can preferably be used as a heat source. However, a heat source may also be in the form of an electrode or a plasma nozzle. A laser can also be provided as a heat source. In this case, heating can then be carried out by guidance into the interior of the tubular piece. In this context, it is advantageous for the light emitted by the laser to be widened by means of appropriate optics and to be scattered at the front edge of the tubular piece for uniform heating of the entire edge there.

However, when using a laser as a heat source, it is also possible to externally heat the front edge of the tubular piece, which faces the discharge vessel, and/or the outer face of the discharge vessel at the intended connection point.

The connection between the tubular piece and the discharge vessel can therefore be produced particularly advantageously at any desired points on the discharge vessel since it is no longer necessary to remove in advance a protective layer which has been applied to the inner face of the discharge vessel. Not least, this makes it possible to reduce the production time and to decrease the production complexity. Furthermore, the entire process can be achieved with a relatively cost-effective design, since a very simple method is also provided in this way. Not least, this makes it possible to reduce the mercury consumption as well, since the layer need no longer be removed.

BRIEF DESCRIPTION OF THE DRAWINGS

In the drawings, like reference characters generally refer to the same parts throughout the different views. The drawings are not necessarily to scale, emphasis generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
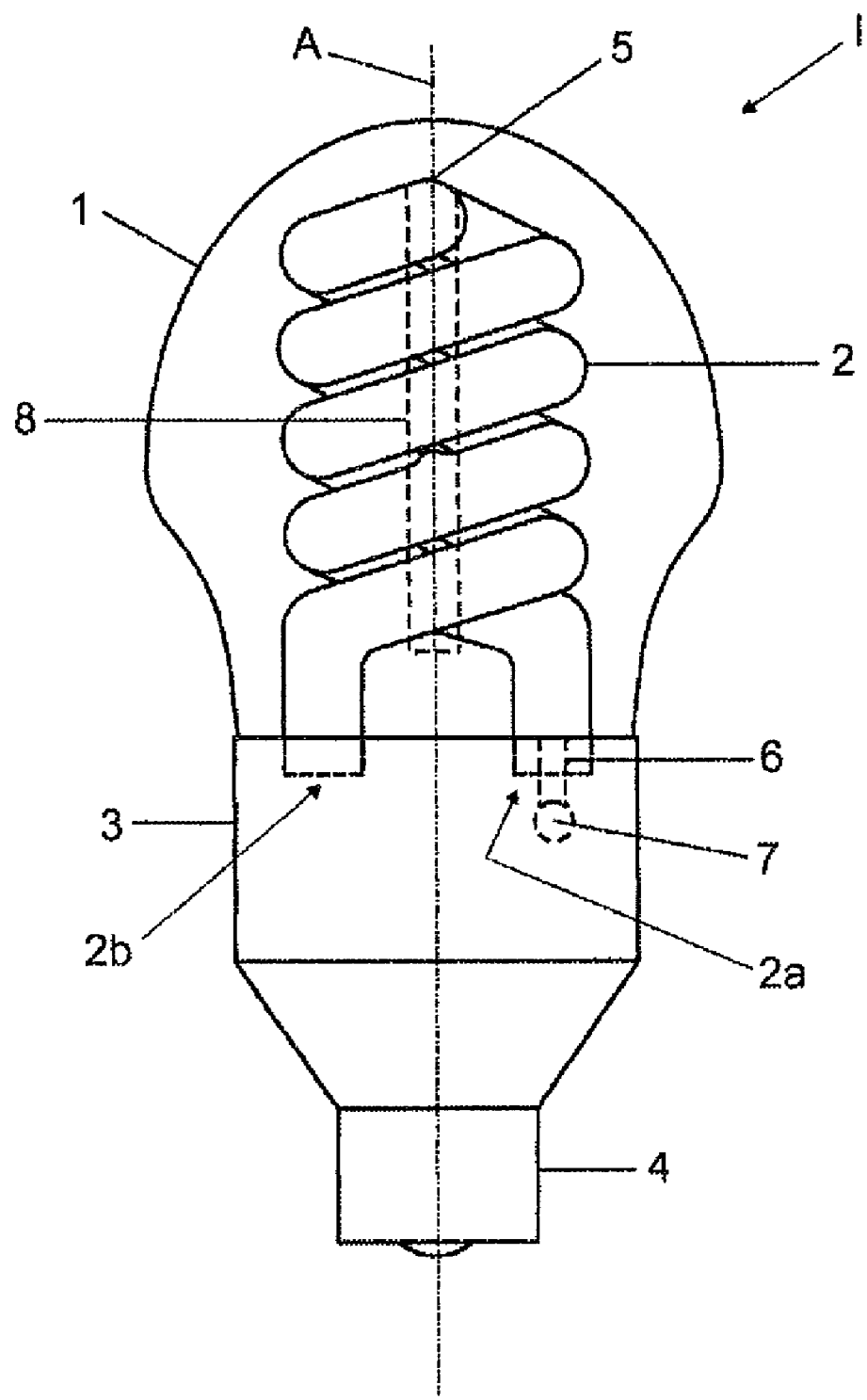
FIG. 1 shows a side view of one embodiment of a discharge lamp produced using the method according to the invention.

FIG. 1 shows a schematic side view of what is just an exemplary embodiment of a discharge lamp I, which is in the form of a compact fluorescent lamp. The discharge vessel I comprises an enveloping bulb 1 which surrounds a discharge vessel 2 that is wound in a spiral or helical shape. The inner face of the discharge vessel 2 is coated with a protective layer, in particular an AlonC layer. A fluorescent layer is applied to this protective layer.

The ends 2a and 2b, which are closed in a gas-tight manner, of the discharge vessel 2 extend into the interior of a housing 3.

In one specific embodiment of the discharge lamp I, an electronic operating device (not illustrated) for the discharge lamp I can be arranged in the housing 3. Both the enveloping bulb 1 and the discharge vessel 2 are firmly connected to the housing 3, in which case, for example, a foaming adhesive or the like may be provided for this purpose.

A cap 4 which, for example, may be a screw cap, is attached to the housing 3.

In particular, the discharge vessel 2 is composed of two sub-pieces which are each wound in a helical shape, thus effectively resulting in a double helix, turning about the axis A. The two sub-pieces of the discharge vessel 2 are connected to one another at the point 5.

In the exemplary embodiment of the discharge lamp I, a first pump tube 6 is fitted as a tubular piece to the end 2a of the discharge vessel 2. A mercury source 7 is incorporated in the pump tube 6.

Furthermore, by way of example, a second tubular piece is shown as a second pump tube 8, which is connected to the discharge vessel 2 at the point 5 and effectively extends in the axial direction, in the vertical direction within the turns of the discharge vessel 2.

A mercury source can also be introduced into this second pump tube 8. However, it is also possible for this second pump tube 8 to be used for evacuation of the discharge vessel 2 and for filling it with filling gas, and for this second pump tube 8 to be separated from the discharge vessel 2 again after the discharge vessel 2 has been evacuated and filled.

Both the point where the second pump tube 8 is fitted and the geometry of the discharge vessel 2 are illustrated simply by way of example in FIG. 1.

The invention allows the pump tube 8 to be connected to the discharge vessel 2 at virtually any desired points, even when the protective layer has already been applied to the discharge vessel 2. This can be done without wiping off or removing the protective layer at the intended connection point.

In addition to the helical configuration of the discharge vessel 2 as shown in FIG. 1, it is also possible in this context for the discharge vessel 2 to have at least one sub-area which is U-shaped. The geometry of the discharge vessel 2 may also be shaped on the basis of a polygonal spiral.

Figure 2:
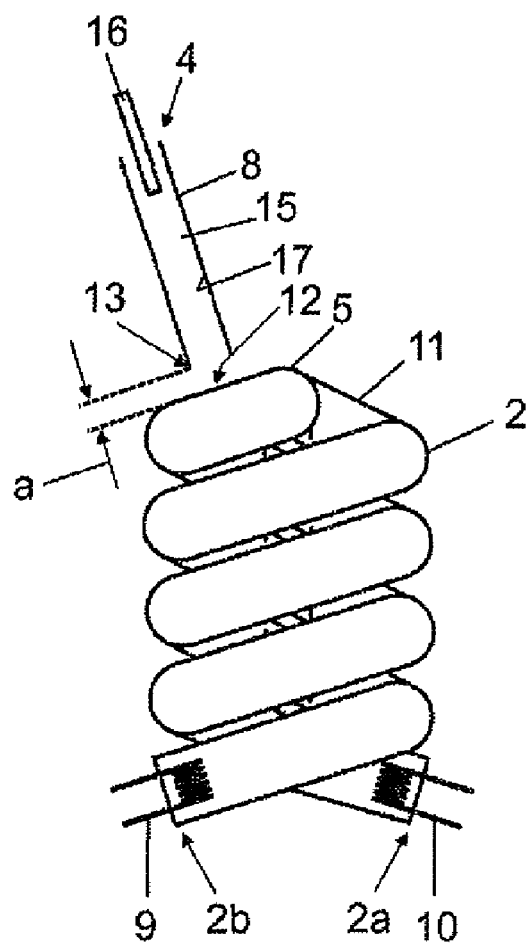
FIG. 2 shows a side view of a further exemplary embodiment of a discharge vessel for a discharge lamp, which discharge vessel is connected to a tubular piece.

The connection between the pump tube 8, which is formed from glass, and the discharge vessel 2, which is formed from glass, will be explained in more detail with reference to the exemplary illustration in FIG. 2. FIG. 2 shows a discharge vessel 2 which likewise has a double-helical shape, with the ends 2a and 2b in this embodiment not being oriented downward in the vertical direction, but running outward inclined. Furthermore, as the illustration in FIG. 2 shows, an electrode 9 extends beyond the end 2b into the interior of the discharge vessel 2, with a further electrode 10 extending beyond the end 2a of the discharge vessel 2 into the interior, and therefore into the discharge area of the discharge vessel 2. Corresponding electrodes are also provided in the embodiment shown in FIG. 1, but are not shown in that figure.

For connection of the pump tube 8 to the discharge vessel 2, the two components are first of all manufactured and produced separately. The pump tube 8 is then positioned at a distance a from the outer face 11 of the discharge vessel 2, in the area of the desired connection point 12. In the exemplary embodiment, a heat source 16, for example a gas burner, is then introduced into the interior 15 of the pump tube 8. In this case, the heat source 16 is introduced via an end 14 of the pump tube 8, which is remote from the discharge vessel 2, and, furthermore, only over a first sub-length. The heat source 16 is then used to heat the end 13 of the pump tube 8 which faces the discharge vessel 2. If required, in this method step, the outer face 11 at the connection point 12 can also be slightly heated. When the edge of the facing end 13 reaches the desired temperature, the heat source 16 is moved further in the direction of the facing end 13 in the interior 15 of the pump tube 8. The outer face 11 at the connection point 12 is then heated further, as a result of which it is possible to ensure a reliable connection when the pump tube 8 is fitted to the outer face 11.

When both the outer face 11 and the end 13 have been appropriately heated, the pump tube 8 is fitted to the outer face 11 at the connection point 12.

In the exemplary embodiment, immediately after this contact has been made, a gas flow is produced in the interior of the discharge vessel 2 and tears open the softened material of the discharge vessel 2 at the connection point 12 in the direction of the interior 15 of the pump tube 8. In this context, by way of example, the gas flow may be produced via one of the openings at the ends 2a or 2b. It should be noted that the electrodes 9 and 10, which are illustrated by way of example in FIG. 2, have not yet been provided at this manufacturing stage, as a result of which accessible openings are available via the ends 2a and 2b. The production of the gas flow tears open the softened material of the wall of the discharge vessel 2 in the direction of the inner face 17 of the pump tube 8 such that the outer face 11 of the softened material rests on the inner face 17. This procedure therefore makes it possible to prevent there being any material from the protective layer in the connection area between the pump tube 8 and the discharge vessel 2. This therefore also makes it possible to prevent the sudden changes in the connection area caused by this material in the protective layer in the prior art.

It is also possible for the wall material of the discharge vessel 2 to be blown through and therefore torn open only when the heat source 16 has been deactivated. However, it is also possible for the heat source 16 also to be active at least at times when the gas flow is blown through in order to tear open the softened material at the connection point 12.

The position of the connection point 12 shown in FIG. 2 is likewise simply an example, and it can also be provided at other points in the discharge vessel 2.

Figure 3:
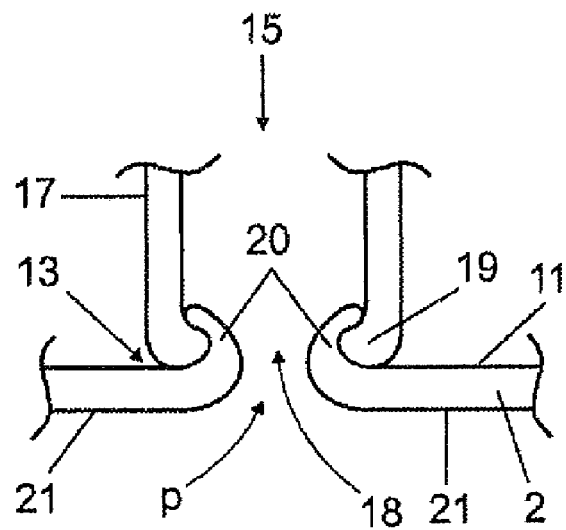
FIG. 3 shows a schematic section illustration through a connection point between a tubular piece and a discharge vessel.

FIG. 3 shows a schematic section illustration of the pump tube 8 in the state in which it is connected to the discharge vessel 2. The heating of the front end 13 results in a bead 19, which is oriented inward, being formed there. The softened, torn-open material 20 of the discharge vessel 2 rests on the inner face 17 thereof in an interlocking manner. Furthermore, the tearing open of the wall material of the discharge vessel 2 results in a continuous hole 18 being produced. As is shown in the section illustration in FIG. 3, the torn-open material of the discharge vessel 2 forms a shape like a collar at the connection point 12. In this context, the shape can also be considered to be like a funnel, with the fact that the torn-open material 20 rests on the inner face 17 in the area of the bead 19 also effectively resulting in engagement behind this bead 19. This configuration effectively also forms an anchorage between the pump tube 8 and the discharge vessel 2. By way of example, the arrow P indicates the flow direction of the gas flow in the discharge vessel 2, the force influence of which allows the softened material of the wall of the discharge vessel 2 to tear open, and therefore to form the hole 18.

Only one direct contact is therefore formed between the inner face 17 and the outer face 11 in the entire connection area. The protective layer which is formed on the inner face 21 of the discharge vessel 2 is therefore not present in this direct connection area.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for connection of a discharge vessel of a discharge lamp to a tubular piece, wherein before making contact with the discharge vessel, the tubular piece is heated at its end, which faces the outside of the discharge vessel, by means of a heat source which is inserted into the interior of the tubular piece
   wherein the discharge vessel is heated at the connection point which is provided with the tubular piece, and the material of the discharge vessel which has been softened at the connection point is torn open such that it rests on the inner face of the tubular piece, and a continuous hole is produced in the discharge vessel.

2. The method as claimed in claim 1,
   wherein the tubular piece is positioned at a distance from the discharge vessel before the connection to the discharge vessel, and that end of the tubular piece which faces the discharge vessel is heated.

3. The method as claimed in claim 1,
   wherein in order to heat the end of the tubular piece over only a first sub-length of the tubular piece, the heat source is inserted into the tubular piece starting from the end which is remote from the discharge vessel.

4. The method as claimed in claim 1,
   wherein the outer face of the discharge vessel is heated at the connection point after the heating of that end of the tubular piece which faces the discharge vessel.

5. The method as claimed in claims 1,
   wherein the outer face of the discharge vessel is heated at the connection point after the heating of that end of the tubular piece which faces the discharge vessel; and
   after the heating of the end of the tubular piece, the heat source is inserted into the tubular piece in order to heat the outer face of the discharge vessel over a second sub-length, which is greater than the first sub-length.

6. The method as claimed in claim 1,
   wherein after the heating of the end which faces the discharge vessel, and after the further heating of the outer face of the discharge vessel at the connection point, the tubular piece is brought into contact with the discharge vessel.

7. The method as claimed in claim 6,
   wherein the material of the discharge vessel, which has been softened by the heating, has a gas flow applied to it at the connection point, such that the softened material tears open and rests on the inner face of the tubular piece.

8. The method as claimed in claim 1,
   wherein before the connection to the tubular piece, the inner face of the discharge vessel is coated with a protective layer.

9. The method as claimed in claim 1,
   wherein the softened material of the discharge vessel rests as a widening collar on the inner face of the end of the tubular piece.

10. The method as claimed in claim 1,
    wherein the tubular piece is in the form of a pump tube.

11. The method as claimed in claim 4,
    wherein the outer face of the discharge vessel is heated further at the connection point after the heating of that end of the tubular piece which faces the discharge vessel.

* * * * *